Patented June 18, 1935

2,005,267

UNITED STATES PATENT OFFICE 2,005,267

PIPE FLANGE CONNECTION

Christian Rehder, Kiel-Gaarden, Germany

Application February 16, 1933, Serial No. 657,010
In Germany September 29, 1932

2 Claims. (Cl. 285—137)

The connection of pipe flanges with the pipes is effected according to the material by soldering or welding in combination with other fixing means, such as rolling, beading, screwing and soldering. The soldering and welding method possesses the advantage that the pipes are tight but the objection that they do not withstand high pressures with the necessary reliability because the soldering and welding process demands considerable skill which the workers seldom possess. The material therefore mostly becomes hot or cold brittle and fails owing to pipe bursts taking place at these points. Methods for connecting pipe flanges without soldering and welding are known, wherein the pipe ends are bent outwards at right angles and drawn together by flange rings loosely placed thereon. This method avoids the objections of the soldering and welding process but is open to the objection that the pipe ends are highly stressed during the bending of the pipe ends at right angles, so that this method cannot be used for flange connections in high pressure conduits with the result that pipe ends with flanges soldered or welded thereon are preferred to those bent outwards at right angles, so that the old defects become apparent again. Further pipes have also already been placed in annular grooves. In this instance either the pipe to be inserted is widened in funnel shape or drawn inwards, the connection being then established by producing by rolling around the beaded end of the pipe to be inserted a ring-shaped edge provided therefor. This connection presents the objection that its resistance is dependent upon the edge already stressed by the beading and therefore very unreliable. This pipe connection can therefore be only employed for low pressures or, in the case of high pressures, in combination with some other fixing means, such as welding in view of the tightness. This manner of connection of the inwardly drawn pipe is also open to the objection that the pipe at this point is of much smaller internal diameter, which limits its use to special instances. Finally, there exist pipes which are turned from solid material with flanges made in one piece with the pipe. This method is, however, so expensive, that such pipes can only be employed in exceptional cases.

The object of the invention is, to overcome these objections in that the pipe end is not widened in funnel-shape, but a conical annular groove is provided in the neck of the flange, the axis of which groove coincides with the flange axis and into which groove the pipe is driven, and that the flange has on its internal diameter a bead-like thickening which, after the insertion of the pipe, is rolled against the same to the desired internal diameter, the annular groove being so large that it can accommodate the material of the inserted pipe and of the flange bead.

The advantages of this type of connection consist in that no rolled or beaded material is stressed as regards resistance, that soldering and welding processes with their objections changing the material do not come into question, the resistance of the connection is not detrimentally affected by the conical widening of the pipe end beyond the permissible measure and the tightness ensured by the rolling into an annular groove, so that therefore an absolutely perfect connection is produced which withstands even high pressures, the operation being further considerably simplified and cheapened, and the flanges can be fitted by unskilled workers.

An embodiment of the invention is illustrated by way of example in the accompanying drawing in which:—

Figure 1:
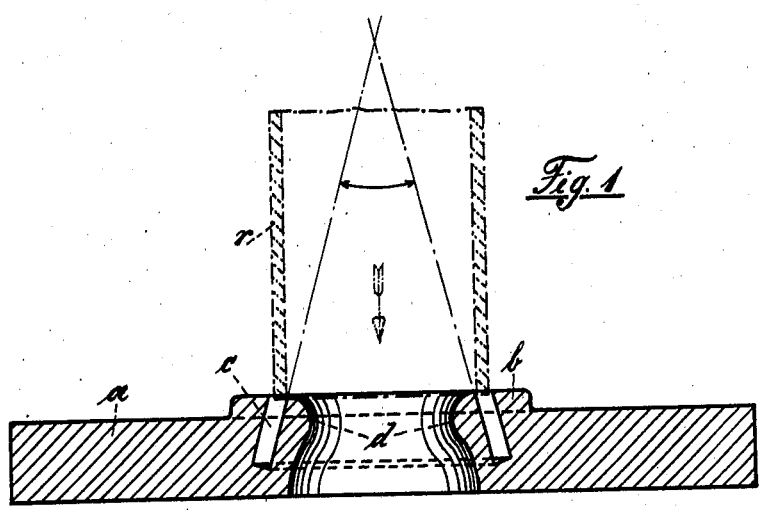
Fig. 1 is a section through the flange before being placed on the pipe.
Figure 2:
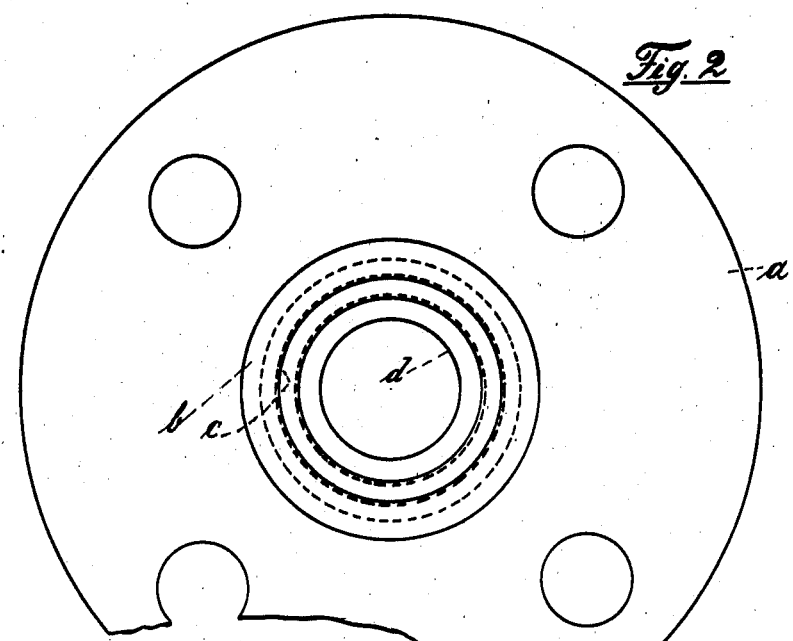
Fig. 2 shows the flange in top plan view.
Figure 3:
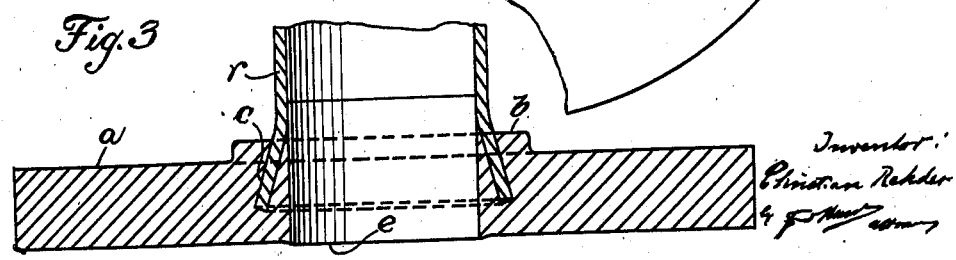
Fig. 3 is a section through a finished flange connection.

According to the invention a standard flange $a$ is used, the neck $b$ of which has an annular groove $c$ which is inclined at an angle to the central axis of the neck $b$ and is slightly wider than the wall of the pipe $r$ to be connected to the flange is thick. The inner wall of the bore of the flange $a$, opposite the annular groove $c$, is inwardly curved to form a bead-shaped projection $d$, the cross section of which depends upon the thickness of the wall of the pipe to be slipped into the annular groove $c$. The annular groove $c$ may be conically widened at the bottom, or it can be provided in known manner with other annular grooves or carried out in any desired cross-section on its inner surfaces. The connection between the flange $a$ and pipe $r$ is effected in the following manner: The end of the pipe $r$ is inserted into the annular groove $c$ in the direction of the arrow and then driven down to the bottom of this groove. The projection $d$ of the wall of the flange bore is then rolled to the internal diameter of the pipe by an ordinary tube roller, so that the pipe $r$ is pressed tightly into the annular groove $c$, a tight and rigid connection between the flange $a$ and pipe $r$ in cold condition being thus effected without any changing of the structure of the material. In the case of especially hard material and of thick-walled pipes, the pipes and flanges can evidently be united in hot condition.

Further, it is pointed out that during rolling the pipe into the flange $a$ the material is slightly raised around the aperture of the flange bore so that, when two pipes are screwed together, the raised portion forms an additional packing surface $e$ which considerably relieves the screw bolts.

I claim:—

1. A pipe flange connection, comprising in combination a pipe and a flange having a neck with a central bore and an annular groove cut in said neck around and separate from said bore and at an incline to the axis thereof so that the inner wall of said groove together with its extension form a cone standing on the neck of said flange, said annular groove adapted to accommodate the end of said pipe, and a bead-like projection on the wall of said bore intermediate its length adapted to be rolled to the internal diameter of said tube after the end of said tube has been pressed into said annular groove.

2. A pipe flange connection as specified in claim 1, in which the groove is profiled in its interior.

CHRISTIAN REHDER.